April 18, 1961 G. W. MESZAROS 2,980,897
CURRENT SUPPLY APPARATUS
Filed Aug. 8, 1957
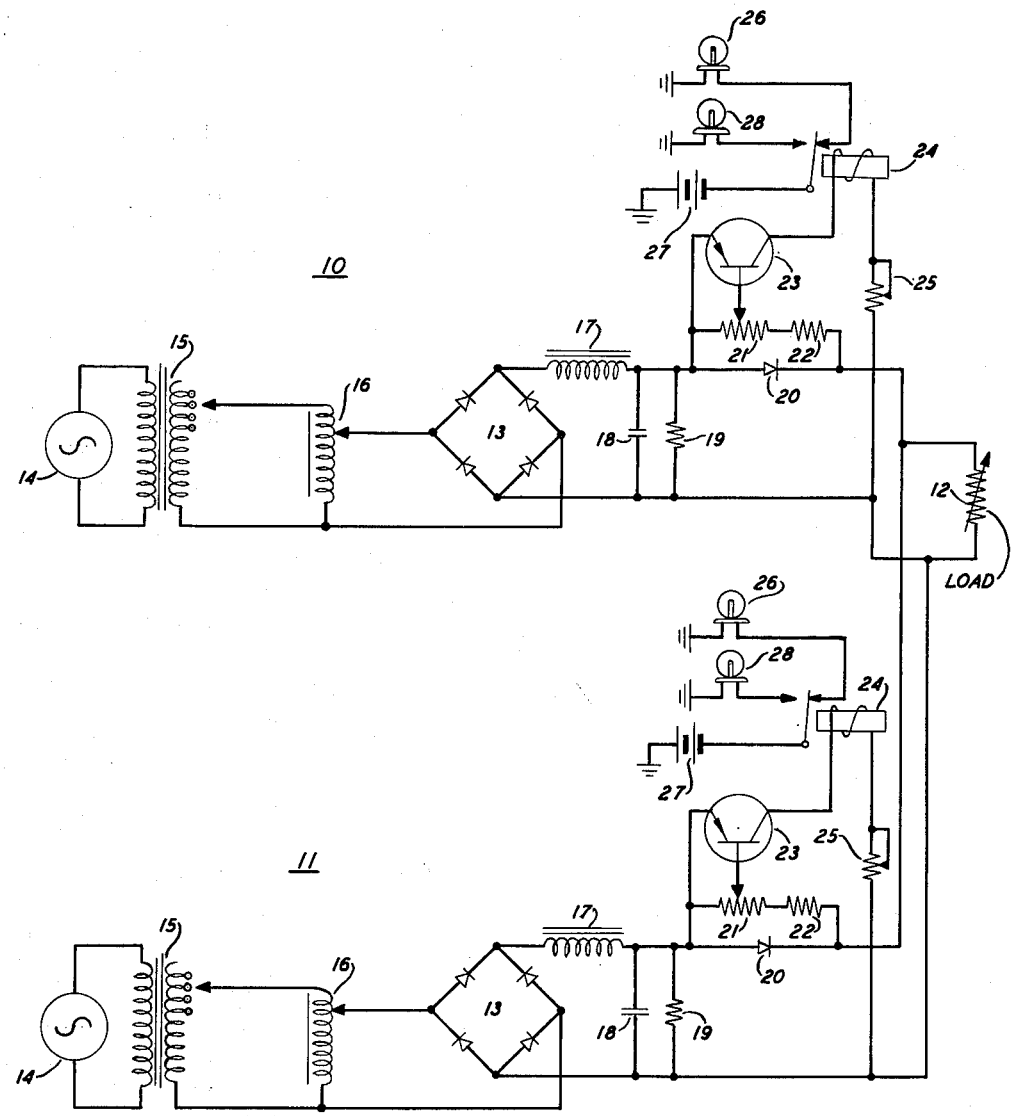
INVENTOR
G.W. MESZAROS
BY
ATTORNEY

United States Patent Office 2,980,897
Patented Apr. 18, 1961

2,980,897

CURRENT SUPPLY APPARATUS

George W. Meszaros, New York, N.Y., assignor to Bell Telephone Laboratories, Incorporated, New York, N.Y., a corporation of New York Filed Aug. 8, 1957, Ser. No. 677,030

3 Claims. (Cl. 340—248)

This invention relates to current supply apparatus and particularly to apparatus for supplying current from a plurality of current supply sources to a common load.

An object of the invention is to provide means for indicating whether or not each of a plurality of current supply sources is supplying current to a common load.

In a specific embodiment of the invention, herein shown and described for the purpose of illustration, a plurality of rectifiers is provided for supplying current to a common load. There are provided a plurality of asymmetrically conducting elements or diodes, one for each rectifier, each having a low resistance to current transmitted therethrough in a forward direction. The output current of each rectifier is transmitted through one of the asymmetrically conducting elements to the common load. When current is flowing from a rectifier to a load, there is set up across the diode a low voltage drop, of the order of one volt, for example, which is substantially constant over a wide range of current flowing through the diode to the load. A portion at least of this voltage drop is impressed across the emitter-base path of a transistor, preferably in a direction to increase the flow of current from the rectifier through a circuit including the emitter-collector path of the transistor. As a result, an electromagnetic relay having a winding connected in the collector-emitter circuit of the transistor is operated to complete a circuit for energizing an indicating device. When the rectifier output voltage becomes less than the load voltage due to a fault in the rectifier circuit, the current in the relay winding is reduced sufficiently to cause the relay armature to release. The release of the relay armature causes the completion of a circuit for energizing a second indicating device to indicate a faulty condition of the rectifier. Under such a faulty condition, the diode in the load circuit prevents the flow of current from the load terminals into the faulty rectifier.

The invention will now be described in greater detail with reference to the accompanying drawing the single figure of which is a schematic view of a current supply circuit embodying the invention.

The drawing shows two similar current supply circuits 10 and 11 for supplying rectified alternating current to a common load 12 which may vary. More than two such supply circuits may be provided for supplying current to the common load 12, if desired. Each of the similar circuits comprises a bridge rectifier 13 to the input of which current is supplied from a source of alternating current 14. There is provided a transformer 15 having a primary winding connected to the alternating-current supply source 14. The secondary winding of transformer 15 has a plurality of taps to permit the winding of a variable autotransformer 16 to be connected across an adjustable portion of the secondary of transformer 15. The input terminals of rectifier 13 are connected across a variable portion of the winding of autotransformer 16.

There is provided a ripple filter comprising a series inductor 17 and a shunt condenser 18 connected to the rectifier output terminals. A bleeder resistor 19 is connected in a shunt path across condenser 18. Current is transmitted from a positive output terminal of rectifier 13 through inductor 17 and through an asymmetrically conducting element or diode 20 in its forward or relatively low resistance direction and through the common load 12 to the negative output terminal of rectifier 13. Across the diode 20 is connected a current path comprising a potentiometer 21 and a resistor 22 in series, the resistor 22 being provided to limit the current which can flow in a leakage path around the diode 20. There is provided a p-n-p type transistor 23 having an emitter connected to a common terminal of diode 20 and of the ripple filter 17, 18 and having a base connected to the variable tap of potentiometer 21. The winding of an electromagnetic relay 24 and a rheostat 25 in series are provided in a current path connecting the collector of transistor 23 to the common negative terminal of the load 12 and rectifier 13. When the relay 24 is operated, as shown, a circuit is completed for energizing a lamp 26 by current from a battery 27. When the armature of relay 24 is released, a circuit is completed for energizing a lamp 28 by current from battery 27.

When current is flowing from a rectifier 13 through a diode 20 in the forward direction to the load 12, the voltage drop across the diode 20 is very low, of the order of one volt, for example, over a wide range of current flowing through the diode. Therefore, the change of load voltage as the result of load changes is negligibly small. Each diode 20 also has a high inverse voltage rating so that the diode effectively prevents the flow of current in the reverse direction through the diode to a faulty rectifier 13. A trouble condition in a rectifier may be due to an alternating-current power failure, a rectifier component failure, a short circuit in the rectifier or a maladjustment of the rectifier output voltage.

When a rectifier 13 is supplying current through a diode 20 to the load 12, an adjustable portion of the forward voltage drop across the diode is impressed across the emitter and base electrodes of the p-n-p transistor 23 to make the emitter positive with respect to the base. As a result, the current flowing from the positive load terminal into the emitter and out of the collector of transistor 23, through the winding of relay 24 and rheostat 25 to the negative load terminal is of sufficient amplitude to cause relay 24 to operate. The lamp 26 is thus energized to indicate that the rectifier is functioning to supply current to the load.

If, due to a trouble condition, a rectifier should stop supplying current to the load, the current flow into the emitter and out of the base of transistor 23 would be discontinued, the current through the winding of relay 24 would be reduced considerably, and the relay 24 would release. Under this condition, the lamp 28 is energized to indicate that the rectifier is not supplying current to the load.

If desired, the indicating apparatus may be associated with the current path connecting the negative load terminal to the negative output terminal of rectifier 13. In this case an n-p-n transistor is provided and the diode 20 is inserted in the current path connecting the negative load terminal to the negative output terminal of rectifier 13. The emitter of the n-p-n transistor is connected to the negative output terminal of rectifier 13, the base is connected to the variable tap of potentiometer 21, and the collector is connected to the positive terminal of the load 12.

What is claimed is:

1. In a current supply apparatus, a source of direct current, a load, an asymmetrically conducting device having a relatively low resistance to current transmitted therethrough in a forward direction, said asymmetrically conducting device being disposed between said direct-current source and said load in such manner as to permit current to flow from said source to said load, switch means, a current conducting path connected across said load, said path including said switch means, biasing means for said switch means connected across said asymmetrically conducting device, said switch means being connected to said biasing means in such manner as to be responsive thereto to close said current conducting path only when current is transmitted through said asymmetrically conducting device in a forward direction, current flow indicating means, said indicating means being responsive to current flowing through said current conducting path.

2. A current supply apparatus in accordance with claim 1 wherein said switch means comprises a transistor having emitter, collector and base electrodes, said current conducting path includes said emitter and collector electrodes, said biasing means includes an impedance means and said emitter and base electrodes are connected to said impedance means.

3. A current supply apparatus in accordance with claim 1 wherein said current flow indicating means comprises a relay winding serially connected to said collector electrode in said current conducting path.

References Cited in the file of this patent

UNITED STATES PATENTS

| | | |
|---|---|---|
| 1,703,146 | Holden | Feb. 26, 1929 |
| 2,101,207 | Williamson | Dec. 7, 1937 |
| 2,821,657 | Newhouse | Jan. 28, 1958 |

OTHER REFERENCES

"Electronic Design," February 15, 1956, pp. 38 to 41.